United States Patent
Hino et al.

(10) Patent No.: US 9,945,101 B2
(45) Date of Patent: Apr. 17, 2018

(54) WORK VEHICLE

(71) Applicant: KOMATSU LTD., Tokyo (JP)

(72) Inventors: Yoshiaki Hino, Komatsu (JP);
Kazuyuki Kirino, Komatsu (JP);
Tomoyuki Iwasawa, Komatsu (JP)

(73) Assignee: KOMATSU LTD., Tokyo (JP)

( * ) Notice: Subject to any disclaimer, the term of this patent is extended or adjusted under 35 U.S.C. 154(b) by 372 days.

(21) Appl. No.: 14/655,370

(22) PCT Filed: Mar. 27, 2015

(86) PCT No.: PCT/JP2015/059594
§ 371 (c)(1),
(2) Date: Jun. 25, 2015

(87) PCT Pub. No.: WO2015/147255
PCT Pub. Date: Oct. 1, 2015

(65) Prior Publication Data
US 2016/0281328 A1  Sep. 29, 2016

(51) Int. Cl.
*E02F 9/20* (2006.01)
*F01P 7/04* (2006.01)
(Continued)

(52) U.S. Cl.
CPC ............ *E02F 9/2095* (2013.01); *B62D 55/06* (2013.01); *E02F 9/02* (2013.01); *E02F 9/0866* (2013.01);
(Continued)

(58) Field of Classification Search
CPC ......... E02F 9/2095; E02F 9/02; E02F 9/0866; E02F 9/2062; E02F 9/26; B62D 55/06; F01P 5/04; F01P 7/044
(Continued)

(56) References Cited

U.S. PATENT DOCUMENTS

| 5,921,883 | A | 7/1999 | Bellinger |
| 7,685,816 | B2 * | 3/2010 | Yabuki ............... F01P 7/044 60/456 |

(Continued)

FOREIGN PATENT DOCUMENTS

| CN | 103069124 A | 4/2013 |
| CN | 103075238 A | 5/2013 |

(Continued)

OTHER PUBLICATIONS

The Office Action for the corresponding Japanese application No. 2015-516326, dated Sep. 29, 2015.
(Continued)

*Primary Examiner* — Jacob D Knutson
(74) *Attorney, Agent, or Firm* — Global IP Counselors, LLP

(57) ABSTRACT

A work vehicle includes a drive unit, a fan motor, a fan configured to be driven by the fan motor, an overrun state detecting unit configured to detect an overrun state of the drive unit, and a control unit. The control unit is configured to control a rotational speed of the fan to reach a first fan rotational speed by increasing the rotational speed of the fan when a detection value detected by the overrun state detecting unit becomes greater than or equal to a first threshold. The control unit is configured to control the rotational speed of the fan to reach a second fan rotational speed higher than the first fan rotational speed when the detection value becomes greater than or equal to a second threshold greater than the first threshold.

12 Claims, 12 Drawing Sheets

(51) Int. Cl.
*B62D 55/06* (2006.01)
*E02F 9/02* (2006.01)
*E02F 9/08* (2006.01)
*E02F 9/26* (2006.01)
*F01P 5/04* (2006.01)
*E02F 3/76* (2006.01)

(52) U.S. Cl.
CPC .............. *E02F 9/2062* (2013.01); *E02F 9/26* (2013.01); *F01P 5/04* (2013.01); *F01P 7/044* (2013.01); *E02F 3/7609* (2013.01); *F01P 2025/04* (2013.01); *F01P 2025/64* (2013.01)

(58) Field of Classification Search
USPC ............................................ 180/9.1; 60/459
See application file for complete search history.

(56) References Cited

U.S. PATENT DOCUMENTS

| | | | |
|---|---|---|---|
| 2005/0077062 A1 | 4/2005 | Fukazawa et al. | |
| 2006/0196179 A1* | 9/2006 | Kesavan | B60T 13/686 60/413 |
| 2008/0023174 A1 | 1/2008 | Nakae et al. | |
| 2009/0025661 A1* | 1/2009 | Itoga | E02F 9/226 123/41.12 |
| 2009/0282824 A1* | 11/2009 | Ando | B28C 5/4213 60/449 |
| 2010/0218494 A1* | 9/2010 | Yasuda | F04C 14/065 60/459 |
| 2012/0017856 A1 | 1/2012 | Nicgorski | |
| 2012/0241235 A1* | 9/2012 | Shintani | E02F 9/2095 180/68.1 |
| 2013/0047955 A1 | 2/2013 | Reedy | |
| 2013/0213023 A1* | 8/2013 | Eckstein | F01P 7/044 60/327 |
| 2013/0277135 A1 | 10/2013 | Sakai et al. | |
| 2016/0053462 A1* | 2/2016 | Nakano | E02F 9/0866 172/811 |

FOREIGN PATENT DOCUMENTS

| | | |
|---|---|---|
| JP | 52-94637 U | 7/1977 |
| JP | 57-32577 U | 2/1982 |
| JP | 6-191317 A | 7/1994 |
| JP | 6-57723 U | 8/1994 |
| JP | 8-142897 A | 6/1996 |
| JP | 2002-528326 A | 9/2002 |
| JP | 2005-113674 A | 4/2005 |
| JP | 2009-507145 A | 2/2009 |
| JP | 2013-227729 A | 11/2013 |
| JP | 2014-114925 A | 6/2014 |
| WO | 2007/074670 A1 | 7/2007 |

OTHER PUBLICATIONS

The Office Action for the corresponding Japanese application No. 2015-516326, dated Feb. 9, 2016.

The International Search Report for the corresponding international application No. PCT/JP2015/059594, dated Jun. 30, 2015.

The Office Action for the corresponding Chinese application No. 2015800001613, dated Jan. 24, 2017.

* cited by examiner

WORK VEHICLE

CROSS-REFERENCE TO RELATED APPLICATIONS

This application is a U.S. National stage application of International Application No. PCT/JP2015/059594, filed on Mar. 27, 2015.

BACKGROUND

Field of the Invention

A work vehicle equipped with a hydro-static transmission (HST) is disclosed.

Background Information

A crawler-type hydraulic drive vehicle equipped with a conventional hydro-static transmission is configured to prevent overrunning thereof in down slope movement by predicting the increased speed thereof and controlling the displacement of a hydraulic pump to cancel out the predicted increased speed (see e.g., Japan Laid-open Patent Application Publication No. H06-191317).

However, the cost required for the crawler-type hydraulic drive vehicle becomes quite high when the hydraulic pump is designed to have a large displacement to cope with all speeds and gradients of slopes that are assumable in movement of the crawler-type hydraulic drive wheel. Thus in reality, it is preferable to set the hydraulic pump to have a displacement enough to cope with speeds and gradients of slopes at which the vehicle is operated with high frequency, and on the premise of the setting, preferable to employ an overrun control aside from an increase in displacement of the hydraulic pump.

A work vehicle in accordance with exemplary embodiments of the present invention is equipped with a hydro-static transmission whereby even when an increase in displacement of a hydraulic pump is limited, overrunning is controllable by another means.

A work vehicle according to a first aspect includes an engine; a fan variable displacement pump and a first travelling variable displacement pump; a first travelling variable displacement motor, a drive unit; a fan motor; a fan; an overrun state detecting unit; and a control unit. The fan variable displacement pump and the first travelling variable displacement pump are configured to be driven by the engine. The first travelling variable displacement motor is configured to be rotated by a pressurized oil of the first travelling variable displacement pump. The drive unit is configured to be driven by the first travelling variable displacement motor. The fan motor is configured to be rotated by a pressurized oil of the fan variable displacement pump. The fan is configured to be driven by the fan motor.

The overrun state detecting unit is configured to detect an overrun state of the drive unit. The control unit is configured to control a rotational speed of the fan to reach a first fan rotational speed by increasing the rotational speed of the fan when a detection value detected by the overrun state detecting unit becomes greater than or equal to a first threshold. The control unit is configured to control the rotational speed of the fan to reach a second fan rotational speed higher than the first fan rotational speed when the detection value becomes greater than or equal to a second threshold greater than the first threshold.

The overrun state detecting unit may include an engine rotational speed detecting unit configured to detect a rotational speed of the engine. The detection value may be the engine rotational speed. The first threshold may be a first engine rotational speed. The second threshold may be a second engine rotational speed higher than the first engine rotational speed.

The first engine rotational speed may be higher than a rated rotational speed. The first engine rotational speed may be higher than a high idle rotational speed.

The present work vehicle may further include a vehicle speed setting unit and a vehicle speed measuring unit. The vehicle speed setting unit may be configured to set a target vehicle speed based on an operating signal detected from an operating member. The vehicle speed measuring unit may be configured to measure an actual speed of the work vehicle. The control unit may be configured to terminate controlling the rotational speed of the fan to reach either the first fan rotational speed or the second fan rotational speed when the actual vehicle speed becomes less than or equal to a predetermined vehicle speed less than or equal to the target vehicle speed.

The second fan rotational speed may be higher than an upper rotational speed limit of the fan to be applied when the engine rotational speed is lower than the first engine rotational speed.

A difference between the second engine rotational speed and the first engine rotational speed may be greater than or equal to 50 rpm and less than or equal to 300 rpm.

A difference between the second fan rotational speed and the first fan rotational speed may be greater than or equal to 250 rpm and less than or equal to 600 rpm.

The aforementioned work vehicle may further include a second travelling variable displacement pump and a second travelling variable displacement motor. The second travelling variable displacement pump may be configured to be driven by the engine. The second travelling variable displacement motor may be configured to be rotated by a pressurized oil of the second travelling variable displacement pump. The drive unit may be configured to be driven by the second travelling variable displacement motor. The drive unit may include right and left crawler belts and right and left sprockets respectively configured to drive the right and left crawler belts. The first travelling variable displacement motor may be configured to drive one of the right and left sprockets. The second travelling variable displacement motor may be configured to drive the other of the right and left sprockets.

The first fan rotational speed and the second fan rotational speed may be predetermined constant values.

The aforementioned work vehicle may include a cab disposed rearward of the engine. The fan may be disposed rearward of and adjacently to the cab.

In the work vehicle according to the first aspect, in loads applied to the variable displacement pumps due to overrunning, the amount of load to be absorbed by the fan variable displacement pump increases. As a result, overrunning is prevented. Additionally, the fan rotational speed is controlled to increase in a stepwise manner in accordance with the state of overrunning. Therefore, when the extent of overrunning is relatively small, the sound of the fan does not increase in volume. When the extent of overrunning is relatively large, overrunning is reliably prevented, and simultaneously, the sound of the fan does not suddenly increase in volume. Therefore, the comfortableness of an operator can be maintained.

DETAILED DESCRIPTION OF EXEMPLARY EMBODIMENTS

A work vehicle according to an exemplary embodiment of the present invention is a work vehicle equipped with a hydro-static transmission, for instance, a bulldozer. In the following explanation, the bulldozer will be explained as an example of the work vehicle equipped with the hydro-static transmission. It should be noted that the term "rotational speed" to be used in the following exemplary embodiment will be used as the same meaning as "the number of revolutions per unit time" to be used by a person skilled in the art. In other words, distinction between positive and negative values attributed to rotational directions should not be considered for the value of the rotational speed.

Entire Construction of Bulldozer

Figure 1:
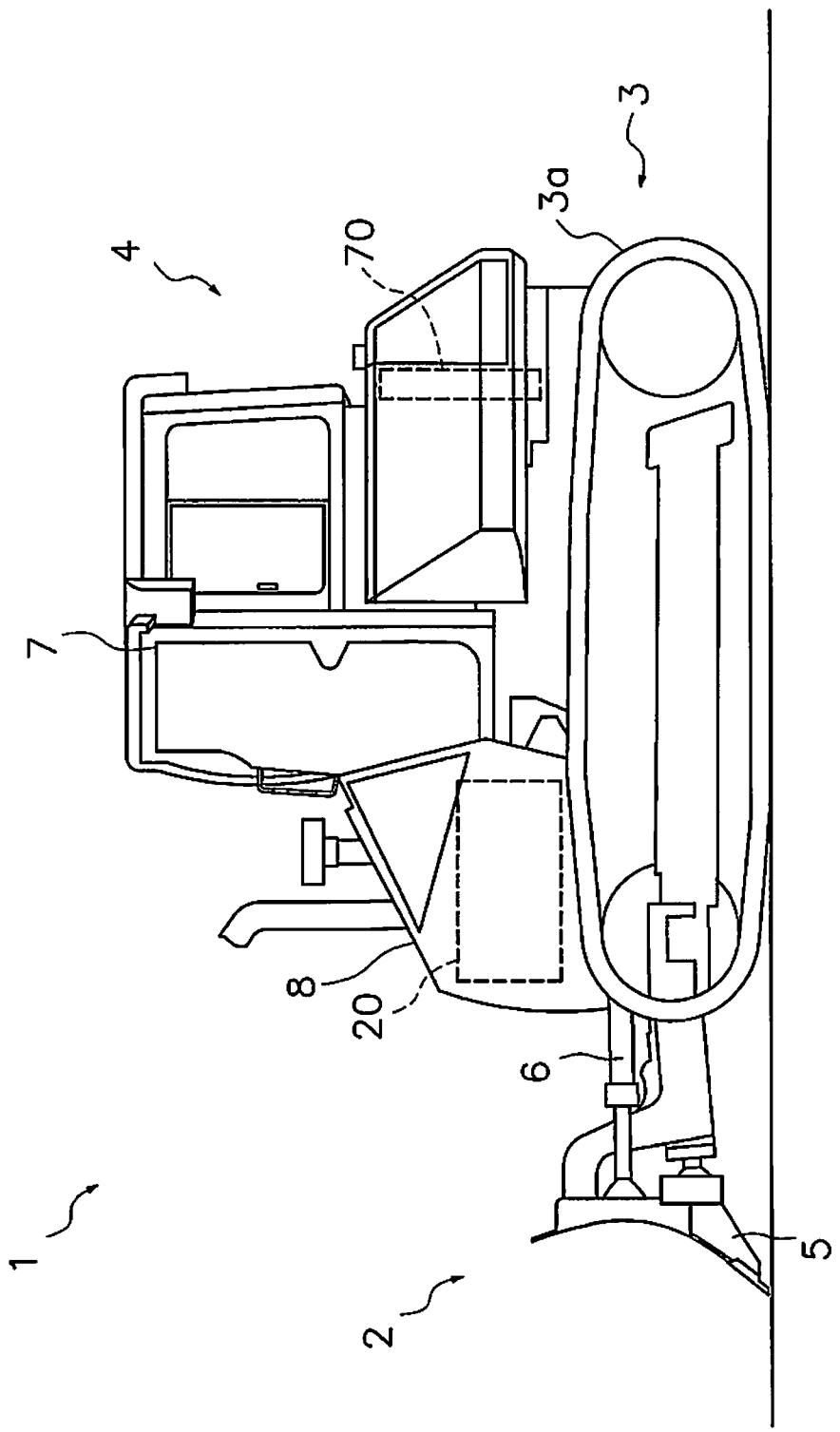
FIG. 1 is a left side view of a bulldozer according to an exemplary embodiment.

FIG. 1 is a side view of a bulldozer 1 according to the exemplary embodiment of the present invention. It should be noted that in the following explanation, a back-and-forth direction means a back-and-forth direction of the bulldozer 1. The back-and-forth direction means a back-and-forth direction seen from an operator seated in a cab (operator's room) 7. Additionally, a right-and-left direction or a lateral direction means a vehicle width direction of the bulldozer 1. The right-and-left direction, the vehicle width direction or the lateral direction is defined as meaning a right-and-left direction seen from the aforementioned operator.

The bulldozer 1 includes a work implement 2, a drive unit 3 and a vehicle body 4. The work implement 2 includes a blade 5 and a hydraulic cylinder 6. The blade 5 is disposed forward of the vehicle body 4. The hydraulic cylinder 6 is configured to be driven by pressurized oil generated in a hydraulic pump not shown in the drawing, and is configured to move the blade 5 up and down. The drive unit 3 is a device for causing the vehicle to travel, and includes a pair of crawler belts 3a and 3b. The drive unit 3 is connected to a hydro-static transmission to be described. When the crawler belts 3a and 3b are driven, the bulldozer 1 is configured to travel. It should be noted that only the crawler belt 3a is shown in FIG. 1, whereas the crawler belt 3b is shown in FIG. 2 to be described.

The vehicle body 4 includes the cab (operator's room) 7, an engine compartment 8 and a cooling device 70. The cab 7 is disposed rearward of the engine compartment 8. A seat and an operating device (not shown in the drawing) are installed inside the cab 7. An engine 20 is accommodated in the engine compartment 8. The cooling device 70 is disposed rearward of and lower than the cab 7. The cooling device 70 is disposed adjacent to the cab 7.

Hydraulic Circuit System

Figure 2:
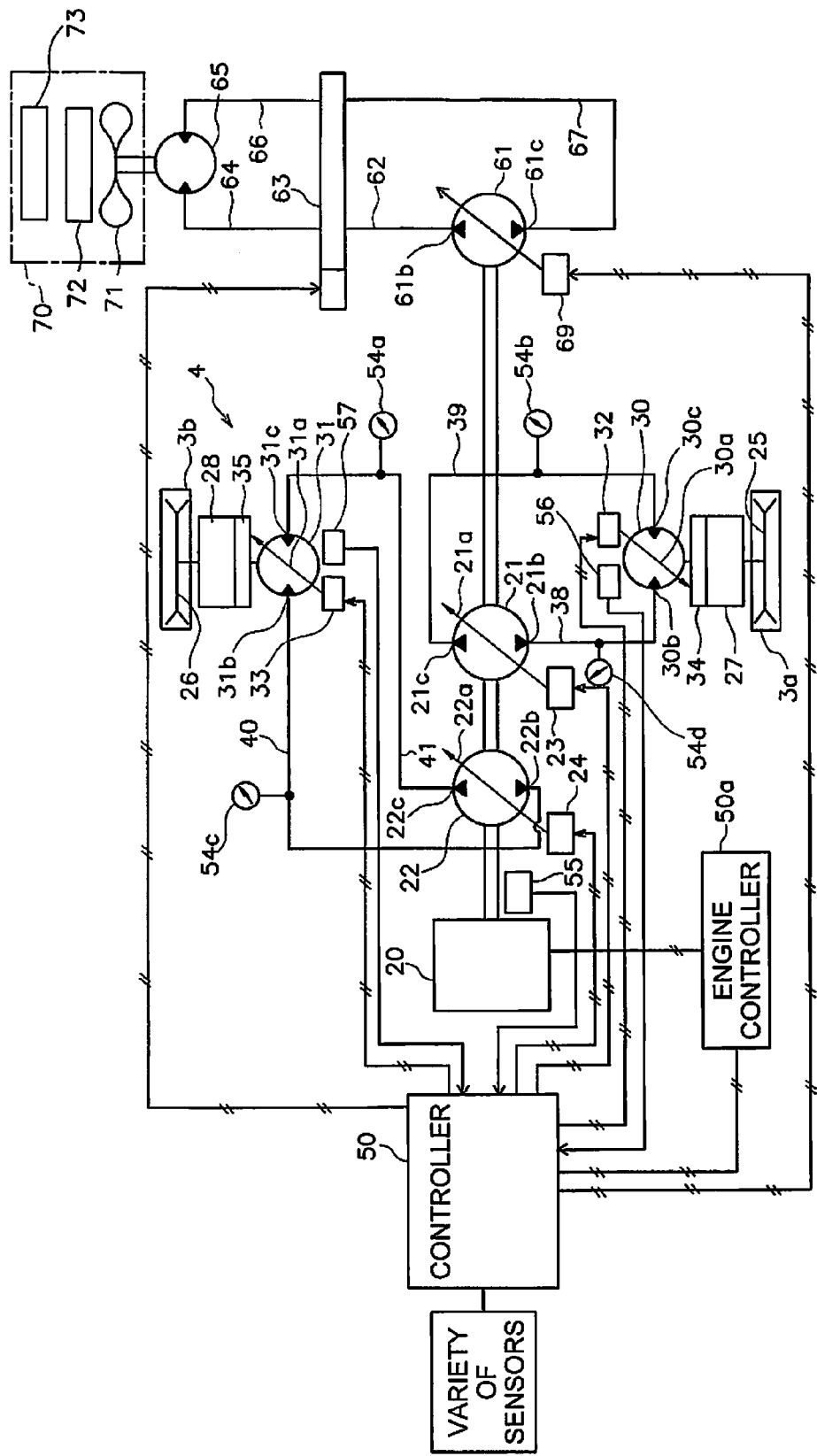
FIG. 2 is a diagram showing a system including hydraulic and control circuits in the bulldozer.

FIG. 2 shows an overview of a system mainly including a hydraulic circuit in the present vehicle. As shown in the drawing, an output shall of the engine 20 is coupled to drive shafts of left and right travelling variable displacement pumps 21 and 22 and a drive shaft of a fan variable displacement pump 61. In other words, the variable displacement pumps 21, 22 and 61 are configured to be driven by the engine 20. Tilt positions (tilt angles) of swashplates 21a and 22a of the left and right variable displacement pumps 21 and 22 are configured to be respectively changed by driving of left and right pump swashplate drive portions 23 and 24. A tilt position (tilt angle) of the fan variable displacement pump 61 is configured to be changed by driving of a fan pump swashplate drive portion 69.

On the other hand, sprockets 25 and 26 for driving the left and right crawler belts 3a and 3b are respectively coupled to drive shafts of left and right travelling variable displacement hydraulic motors 30 and 31 through left and right final reducers 27 and 28. The left and right travelling variable displacement hydraulic motors 30 and 31 are respectively configured to drive the left and right sprockets 25 and 26. Tilt positions (tilt angles) of swashplates 30a and 31a of the left and right variable displacement hydraulic motors 30 and 31 are respectively configured to be changed by driving of left and right motor swashplate drive portions 32 and 33. The left and right variable displacement hydraulic motors 30 and 31 and the left and right variable displacement pumps 21 and 22 compose the hydro-static transmission.

It should be noted that left and right brake devices 34 and 35 are respectively mounted to the drive shafts of the left and right variable displacement hydraulic motors 30 and 31 to stop rotation of the respective hydraulic motors 30 and 31.

Additionally, inlet and outlet ports 30b and 30c of the left variable displacement hydraulic motor 30 are respectively connected to discharge and intake ports 21b and 21c of the left variable displacement pump 21 through oil paths 38 and 39. In other words, the left variable displacement hydraulic motor 30 is configured to be rotated by the pressurized oil of the variable displacement pump 21. Likewise, inlet and outlet ports 31b and 31c of the right variable displacement hydraulic motor 31 are respectively connected to discharge and intake ports 22b and 22c of the right variable displacement pump 22 through oil paths 40 and 41. In other words, the right variable displacement hydraulic motor 31 is configured to be rotated by the pressurized oil of the variable displacement pump 22.

The cooling device 70 includes a cooling fan 71, an oil cooler 72 and a radiator 73. The cooling fan 71 is configured to feed cooling air to the oil cooler 72 and the radiator 73. The cooling fan 71 is coupled to a drive shaft of a fixed displacement hydraulic motor 65.

The hydraulic motor 65 is connected to an electromagnetic switch valve 63 through oil paths 64 and 66. An input port of the electromagnetic switch valve 63 is connected to an outlet port 61b of the fan variable displacement pump 61 through an oil path 62. On the other hand, an output port of the electromagnetic switch valve 63 is connected to an inlet port 61c of the fan variable displacement pump 61 through an oil path 67. Therefore, the hydraulic motor 65 is configured to be rotated by the pressurized oil of the variable displacement pump 61. The electromagnetic switch valve 63 is configured to control the rotational speed of the hydraulic motor 65 (i.e., the cooling fan 71) and so forth by controlling the flow rate of the pressurized oil to be outputted to the hydraulic motor 65 and so forth in response to a current command signal received from a controller 50.

Through an oil path (not shown in the drawing), the oil cooler 72 is configured to cool down the hydraulic oil circulating through the oil paths 38 and 39, the hydraulic oil circulating through the oil paths 40 and 41, and the hydraulic oil circulating through the oil paths 62, 64, 66 and 67. The radiator 73 is configured to cool down a refrigerant of the engine 20.

In the aforementioned system configuration, signals are configured to be inputted into the controller 50 from a variety of sensors including an engine rotational speed sensor 55 for detecting the rotational speed of the engine 20, a left rotational speed sensor 56 for detecting the rotational speed of the output shaft of the left variable displacement hydraulic motor 30, a right rotational speed sensor 57 for detecting the rotational speed of the output shaft of the right variable displacement hydraulic motor 31, a sensor 54a for detecting the hydraulic pressure to be supplied to the right side drive unit 3 in forward movement, a sensor 54b for detecting the hydraulic pressure to be supplied to the left side drive unit 3 in forward movement, a sensor 54c for detecting the hydraulic pressure to be supplied to the right side drive unit 3 in rearward movement, and a sensor 54d for detecting the hydraulic pressure to be supplied to the left side drive unit 3 in rearward movement.

The pump swashplate drive portions 23 and 24 of the variable displacement pumps 21 and 22, the motor swashplate drive portions 32 and 33 of the variable displacement hydraulic motors 30 and 31, the pump swashplate drive portion 69 of the variable displacement pump 61, and the electromagnetic switch valve 63 are configured to be controlled by control signals to be outputted from the controller 50.

Additionally, the controller 50 is configured to transmit an engine rotational speed command signal to an engine controller 50a on the basis of the signals from the variety of sensors. In turn, the engine controller 50a is configured to control the engine 20 on the basis of the engine rotational speed command signal.

Control Blocks

Figure 3:
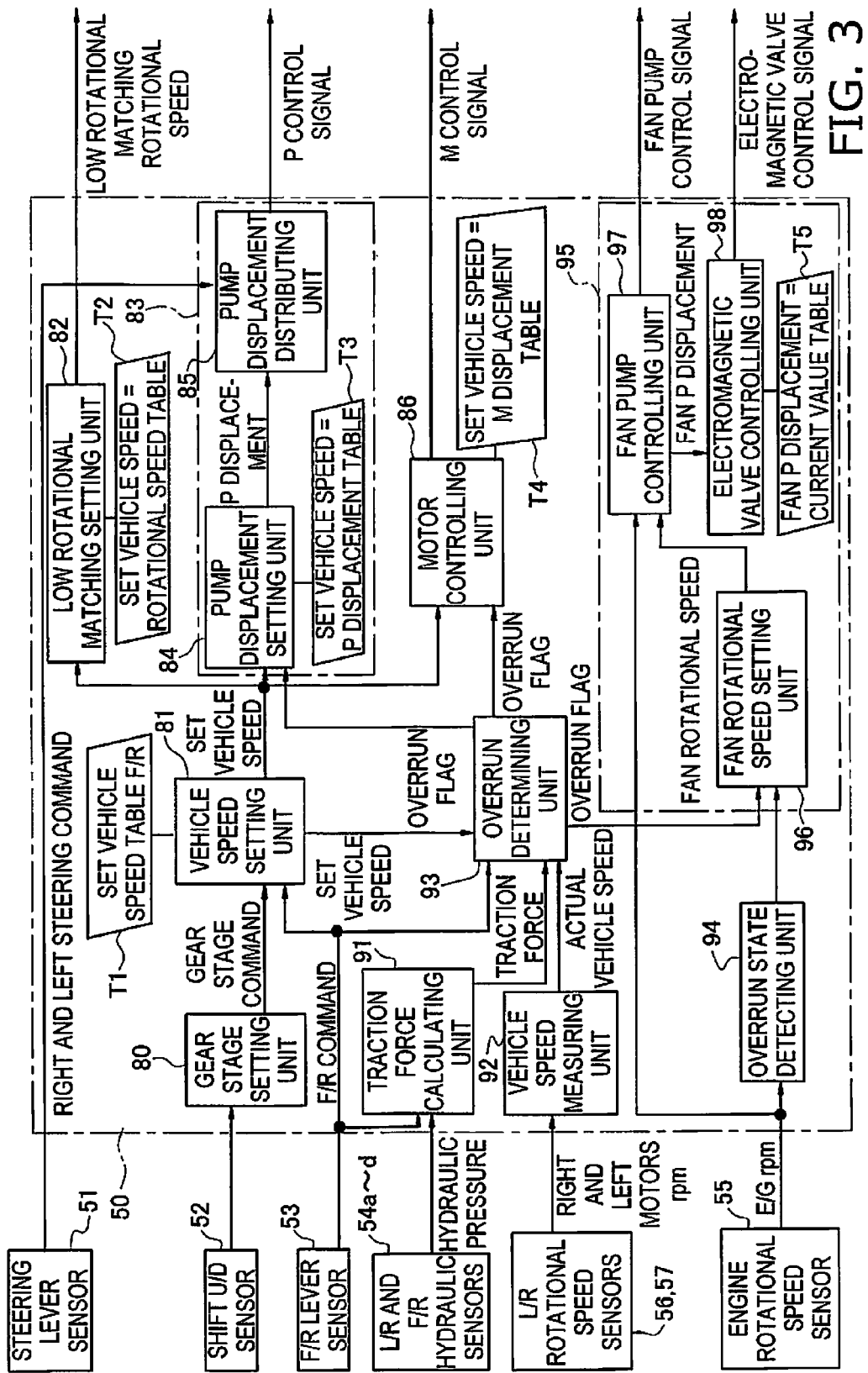
FIG. 3 is a functional block diagram of a controller of the bulldozer.

FIG. 3 shows a control block diagram of the present vehicle. In FIG. 3, a variety of sensors connected to the controller 50 are shown and functions of the controller 50 are shown in block representation.

Sensors

Sensors connected to the controller 50 include a steering lever sensor 51, a shift up/down button sensor 52 and a forward/rearward movement lever sensor 53 other than the aforementioned sensors, including the engine rotational speed sensor 55, the left rotational speed sensor 56, the right rotational speed sensor 57 and the pressure sensors 54a to 54d configured to detect the pressures of the respective oil paths shown in FIG. 2.

The steering lever sensor 51 is a sensor for detecting the stroke of a steering lever operated rightward or leftward by an operator. The steering lever sensor 51 is configured to output a right/left steering command in accordance with the operating stroke. The shift up/down button sensor 52 is a sensor for detecting that the operator has operated a button for gear upshift or downshift. Accordingly, a gear stage instructed by the operator is detected. The forward/rearward movement lever sensor 53 is a sensor for detecting which of forward movement and rearward movement has been instructed by the operator. The forward/rearward movement lever sensor 53 is configured to output a forward/rearward movement command for instructing forward movement or rearward movement.

Controller (Control Unit)

The controller 50 includes an arithmetic logic unit, such as a CPU, and a storage device including a RAM and a ROM. In the following explanation, the controller 50 may be referred to as a control unit. The controller 50 includes a gear stage setting unit 80, a vehicle speed setting unit 81, a low rotational matching setting unit 82, a pump controlling unit 83, a motor controlling unit 86, a traction force calculating unit 91, a vehicle speed measuring unit 92, an overrun determining unit 93, an overrun state detecting unit 94 and a fan controlling unit 95.

The pump controlling unit 83 includes a pump displacement setting unit 84 and a pump displacement distributing unit 85. The fan controlling unit 95 includes a fan rotational speed setting unit 96, a fan pump controlling unit 97 and an electromagnetic valve controlling unit 98. In the controller 50, programs and data for performing respective these functions are typically stored in the storage device. Additionally, when the arithmetic logic unit runs the programs, the controller 50 is configured to perform these respective functions. It should be noted that the controller 50 may be implemented by an integrated circuit.

The gear stage setting unit 80 is configured to set a gear stage in response to a signal received from the shift up/down button sensor 52 and output the set gear stage as a gear stage command to the vehicle speed setting unit 81. A shift mode that enables quick gear shifting (for example, gear shifting is enabled in three stages) and a shift mode that enables minute gear shifting (for example, gear shifting is enabled in 19 stages) are set in the present vehicle. A gear stage is herein configured to be set in accordance with the shift mode or in accordance with the shift button setting by an operator.

The vehicle speed setting unit 81 includes a set vehicle speed table T1 and is configured to set a vehicle speed (the highest vehicle speed in a set gear stage) on the basis of the gear stage command and a forward/rearward movement command. The vehicle speed, set by the vehicle speed setting unit 81, is herein referred to as a set vehicle speed. It should be noted that the set vehicle speed table T1 contains a table to be used for forward movement and a table to be used for rearward movement. The set vehicle speed table T1 is stored in the aforementioned storage device.

The low rotational matching setting unit 82 includes a set vehicle speed=rotational speed table T2. When the set vehicle speed, set by the vehicle speed setting unit 81, falls in a preliminarily set low and middle speed range and even when a high idle rotational speed is set by a fuel dial (not shown in the drawings), the low rotational matching setting unit 82 is configured to set the upper limit of the engine rotation to a low matching rotational speed that is lower than the high idle rotational speed. The high idle rotational speed means the maximum engine rotational speed Nhi [rpm] with no load shown in FIG. 4.

Figure 5:
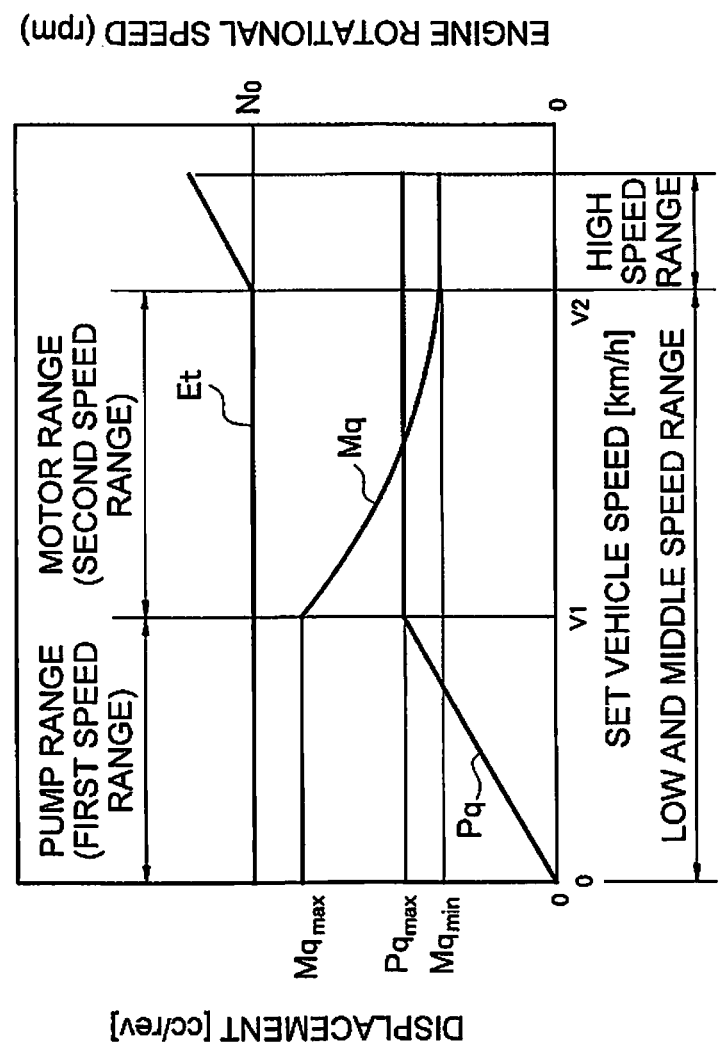
FIG. 5 is a diagram showing engine rotational speed, pump displacement and motor capacity in a low rotational matching processing.

An engine control signal is configured to be outputted from the low rotational matching setting unit 82 to rotate the engine 20 at a rotational speed N0 [rpm] that is lower than the high idle rotational speed Nhi [rpm] when the set vehicle speed is in a range of 0 to V2 [km/h] as indicated by a characteristic Et in FIG. 5 as an example. On the other hand, when the set vehicle speed falls in a high speed range of V2 [km/h] or greater, an engine control signal is configured to be outputted to increase the engine rotational speed to the high idle rotational speed in proportion to the set vehicle speed. The set vehicle speed=rotational speed table T2 is a table describing a correspondence shown in FIG. 5 between the set vehicle speed and the engine rotational speed. The set vehicle speed=rotational speed table T2 is stored in the aforementioned storage device.

It should be noted that the set vehicle speed=rotational speed table T2, a set vehicle speed=pump displacement table T3 to be described and a set vehicle speed=motor displacement table T4 to be described are superimposed in the representation of FIG. 5.

The pump displacement setting unit 84 includes the set vehicle speed=pump displacement table T3. The set vehicle speed=pump displacement table T3 is a table describing a correspondence shown in FIG. 5 between the set vehicle speed and the value of displacement Pq of the variable displacement pump 21, 22 (hereinafter simply referred to as a pump displacement Pq). The set vehicle speed=pump displacement table T3 is stored in the aforementioned storage device.

The pump displacement setting unit 84 is configured to set the pump displacement Pq in accordance with the set vehicle speed set by the vehicle speed setting unit 81 with reference to the set vehicle speed=pump displacement table T3 in a state that an overrun control to be described is not being performed. Specifically, the pump displacement setting unit 84 is configured to increase the pump displacement in proportion to the set vehicle speed until the pump displacement Pq is maximized, i.e., until a command vehicle speed reaches, for instance, V1 [km/h], and is configured to maintain the pump displacement constant after the pump displacement reaches a maximum displacement Pqmax.

The pump displacement distributing unit 85 is configured to receive the pump displacement outputted from the pump displacement setting unit 84 and the steering command from the right/left steering lever and the forward/rearward movement lever. The steering command indicates a ratio of the pump displacements of the left and right variable displacement pumps 21 and 22 in accordance with the steering lever and the forward/rearward movement lever. By taking account of the steering command, the pump displacement distributing unit 85 is configured to convert the set pump displacement into a current command and output the current command as a control signal to each left/right pump swashplate drive portion 23, 24.

The motor controlling unit 86 includes the set vehicle speed=motor displacement table T4. The set vehicle speed=motor displacement table T4 is a table describing a correspondence shown in FIG. 5 between the set vehicle speed and the value of displacement Mq of each variable displacement hydraulic motor 30, 31 (hereinafter simply referred to as a motor displacement Mq). The set vehicle speed=motor displacement table T4 is stored in the aforementioned storage device. The motor controlling unit 86 is configured to set the motor displacement in accordance with the set vehicle speed set by the vehicle speed setting unit 81 with reference to the set vehicle speed=motor displacement table T4.

Specifically, the motor controlling unit 86 is configured to maintain the motor displacement Mq constant at a displacement Mqmax until the pump displacement is maximized, i.e., until the set vehicle speed reaches, for instance, V1 [km/h] in the state that the overrun control to be described is not being performed. After the pump displacement reaches the maximum displacement Pqmax, the motor controlling unit 86 is configured to gradually reduce the motor displacement Mq in proportion to increase in set vehicle speed. The motor controlling unit 86 is configured to convert the motor displacement Mq thus obtained into a current command and output the current command as a control signal to each left/right motor swashplate drive portion 32, 33.

In the present exemplary embodiment, the set vehicle speed=pump displacement table T3 and the set vehicle speed=motor displacement table T4 are herein set such that the vehicle speed can reach the set vehicle speed set by the vehicle speed setting unit 81 even when the engine 20 is rotated at N0 [rpm].

As described above, the set vehicle speed=rotational speed table T2, the set vehicle speed=pump displacement table T3 and the set vehicle speed=motor displacement table T4 are superimposed in the representation of FIG. 5. In FIG. 5, in the low and middle speed range, the pump displacement Pq and the motor displacement Mq are set such that the set vehicle speed can be achieved when the engine 20 is rotated at a rotational speed of N0 [rpm]. In the low and middle speed range, a part in which the set vehicle speed is relatively low corresponds to a pump range in which the vehicle speed is changed by changing the pump displacement, with the motor displacement being maximized. On the other hand, in the low and middle speed range, the remaining part in which the set vehicle speed is relatively high corresponds to a motor range in which the vehicle speed is changed by changing the motor displacement, with the pump displacement being maximized.

The high speed range is a range in which the vehicle speed cannot reach the set vehicle speed by controlling the variable displacement pumps and the variable displacement hydraulic motors. Because of this, in the high speed range, as described above, the engine rotational speed is increased to the high idle rotational speed in proportion to the set vehicle speed, and the vehicle speed is changed by controlling the engine rotational speed.

The traction force calculating unit 91 is configured to measure the traction force of the bulldozer 1 on the basis of the detection results from the forward/rearward movement lever sensor 53 and the pressure sensors 54a to 54d. The vehicle speed measuring unit 92 is configured to measure the actual vehicle speed of the bulldozer 1 through calculation of the actual vehicle speed to be conducted by multiplying the diameter of the sprockets 25 and 26 and pi for a smaller one of the rotational speed of the output shaft of the left variable displacement hydraulic motor 30 to be received from the left rotational speed sensor 56 and the rotational speed of the output shaft of the right variable displacement hydraulic motor 31 to be received from the right rotational speed sensor 57.

The overrun determining unit 93 is configured to determine whether or not the overrun control is required by comparing the actual vehicle speed of the bulldozer 1 and the set vehicle speed. The overrun control is a control of inhibiting the actual vehicle speed by maximizing the pump displacement of each variable displacement pump 21, 22 in an overrun state that the actual vehicle speed of the bulldozer 1 greatly exceeds the set vehicle speed. When the overrun state is even continuously detected while the overrun control is being performed, a control of reducing the load of the engine 20 is additionally performed by increasing the rotational speed of the cooling fan 71 to be higher than the normal rotational speed thereof.

For example, the overrun determining unit 93 may be configured to determine that the bulldozer 1 is not in the overrun state, for instance, (1) when the actual vehicle speed measured by the vehicle speed measuring unit 92 is less than or equal to an overrun control terminating vehicle speed (to be described) set by the motor controlling unit 86 or (2) when a predetermined period of time or greater elapses in a state that the traction force is larger than a predetermined threshold slightly less than 0.

The overrun determining unit 93 is configured to output an overrun flag describing a determination result to the pump displacement setting unit 84, the motor controlling unit 86 and the fan rotational speed setting unit 96. When the overrun determining unit 93 determines that the bulldozer 1 is in the overrun state, the overrun flag is set to be "True". When the overrun determining unit 93 determines that the bulldozer 1 is not in the overrun state, the overrun flag is set to be "False".

When receiving the overrun flag of "False", the pump displacement setting unit 84 is configured not to perform the overrun control. Hence, as described above, the pump displacement setting unit 84 is configured to set the pump displacement with reference to the set vehicle speed=pump displacement table T3. Then, the pump controlling unit 83 is configured to control the left and right pump swashplate drive portions 23 and 24 on the basis of the set pump displacement. When receiving the overrun flag of "True", the pump displacement setting unit 84 is configured to set the pump displacement to be the maximum displacement Pqmax. Then, the pump controlling unit 83 is configured to control the left and right pump swashplate drive portions 23 and 24 such that the pump displacement reaches the maximum displacement Pqmax.

When receiving the overrun flag of "False", the motor controlling unit 86 is configured not to perform the overrun control. Hence, as described above, the motor controlling unit 86 is configured to set the motor displacement with reference to the set vehicle speed=motor displacement table T4 and control the left and right motor swashplate drive portions 32 and 33. When receiving the overrun flag of "True", the motor controlling unit 86 is configured to perform the overrun control as follows.

When the overrun determining unit 93 determines that the bulldozer 1 is in the overrun state, the motor controlling unit 86 is configured to obtain an overrun control target vehicle speed with respect to the set vehicle speed set by the vehicle speed setting unit 81. For example, the motor controlling unit 86 may be configured to obtain the overrun control target vehicle speed with reference to a preliminarily set table. Alternatively, the motor controlling unit 86 may be configured to obtain the overrun control target vehicle speed by calculation through comparison between the set vehicle speed and the actual vehicle speed.

The motor controlling unit 86 is configured to obtain the target displacement of each variable displacement hydraulic motor 30, 31 with reference to the set vehicle speed=motor displacement table T4 by assigning the obtained overrun control target vehicle speed to the set vehicle speed. The motor controlling unit 86 is configured to control the variable displacement hydraulic motors 30 and 31 such that the displacement of each variable displacement hydraulic motor 30, 31 reaches the target displacement. In other words, the motor controlling unit 86 is configured to control the motor swashplate drive portions 32 and 33 of the variable displacement hydraulic motors 30 and 31 such that the displacement of each variable displacement hydraulic motor 30, 31 reaches the target displacement.

Figure 6:
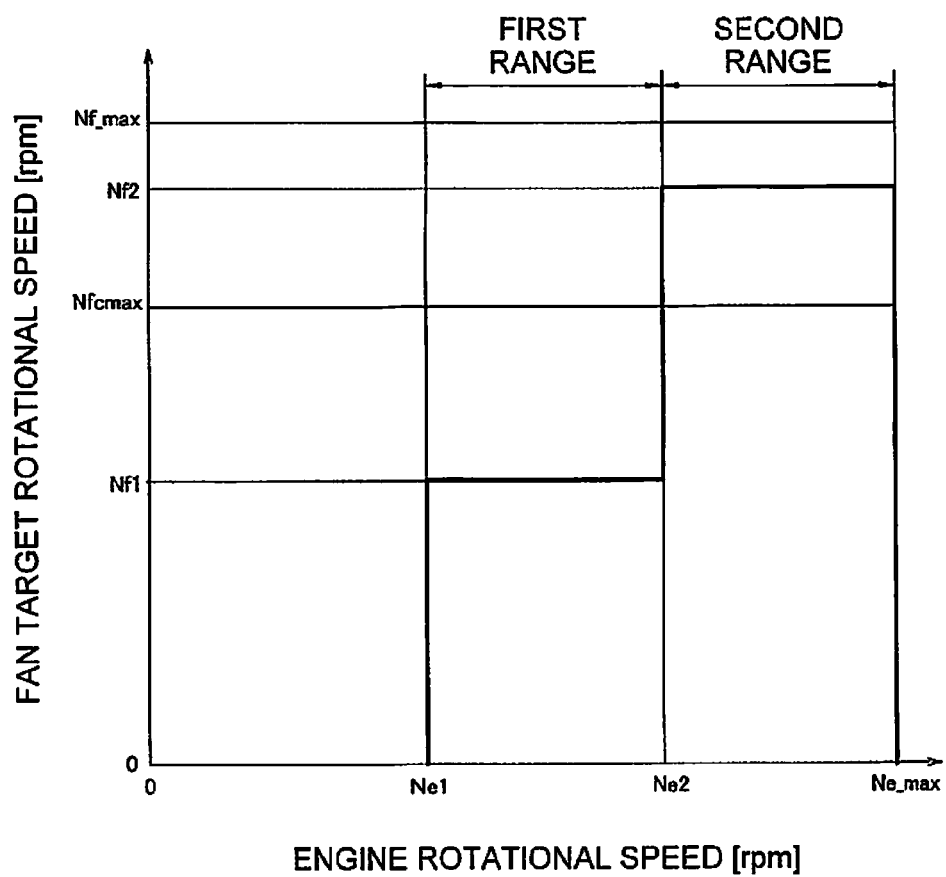
FIG. 6 is a diagram showing a relation between engine rotational speed and target fan rotational speed.

The overrun state detecting unit 94 is configured to detect the overrun state under the condition that the aforementioned overrun control is being performed. Specifically, the overrun state detecting unit 94 is configured to determine whether or not the engine rotational speed detected by the engine rotational speed sensor 55 falls in a first range, whether or not the engine rotational speed falls in a second range, and whether or not the engine rotational speed falls in neither the first range nor the second range. As shown in FIG. 6, the first range is a range in which the engine rotational speed is greater than or equal to Ne1 [rpm] and less than Ne2 [rpm]. The second range is a range in which the engine rotational speed is greater than or equal to Ne2 [rpm] and less than Ne_max [rpm] that is the critical rotational speed of the engine 20.

The overrun state detecting unit 94 is configured to detect, as the overrun state, a state that the engine rotational speed falls in the first range or the second range. Ne1 [rpm] is a preliminarily set constant value, and may be referred to as a first threshold or a first engine rotational speed. Ne2 [rpm] is a preliminarily set constant value, and may be referred to as a second threshold or a second engine rotational speed.

Figure 4:
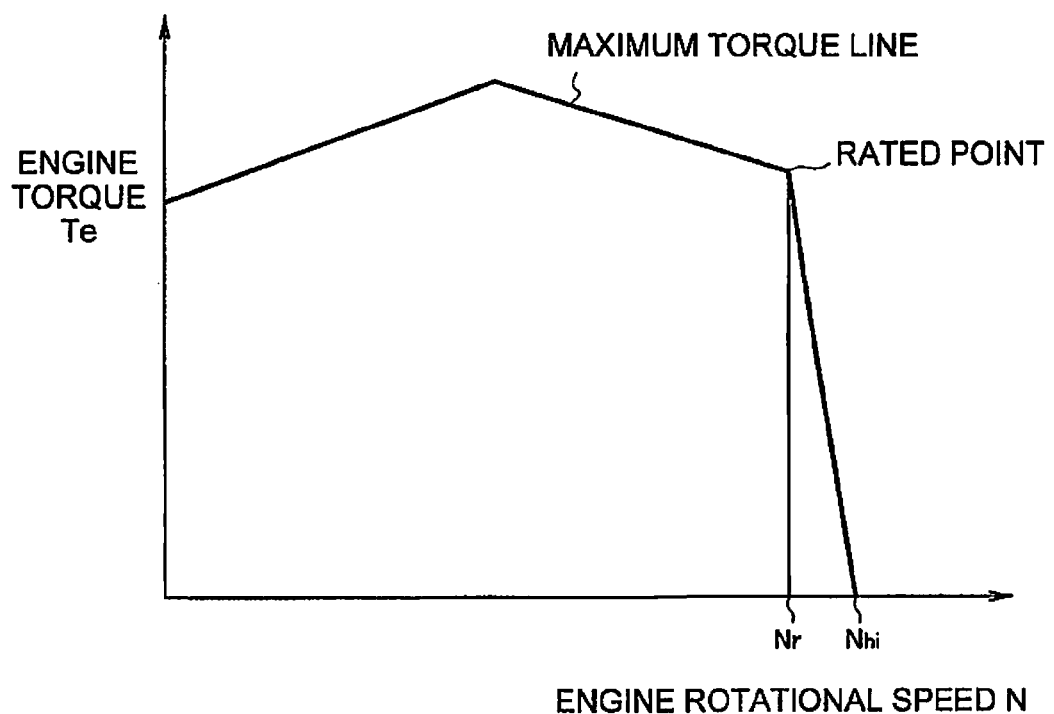
FIG. 4 is a torque diagram of an engine.

Ne1 [rpm] is herein higher than a rated rotational speed Nr [rpm] of the engine 20. As shown in FIG. 4, the rated rotational speed is a rotational speed of the engine 20 at a rated point that the engine 20 delivers a rated output. Moreover, Ne1 [rpm] is higher than the aforementioned N0 [rpm]. Additionally, the difference between the minimum value Ne2 [rpm] in the second range and the minimum value Ne1 [rpm] in the first range is greater than or equal to 50 rpm and less than or equal to 300 rpm. With the configuration, excessive increase in engine rotational speed is prevented even when time delay occurs when the rotational speed of the cooling fan 71 increases.

The fan controlling unit 95 is configured to control the fan variable displacement pump 61 and the hydraulic motor 65 such that the rotational speed of the cooling fan 71 reaches a first rotational speed Nf1 when the engine rotational speed falls in the first range. The fan controlling unit 95 is configured to control the fan variable displacement pump 61 and the hydraulic motor 65 such that the rotational speed of the cooling fan 71 reaches a second rotational speed Nf2 when the engine rotational speed falls in the second range.

As shown in FIG. 6, the value of the second rotational speed Nf1 is smaller than but close to Nf_max [rpm] that is the critical rotational speed of the cooling fan 71. Additionally, the second rotational speed Nf2 is higher than the rust rotational speed Nf1. The difference between the second rotational speed Nf2 and the first rotational speed Nf1 is greater than or equal to 250 rpm and less than or equal to 600 rpm. With the configuration, noise is unlikely to be produced when the cooling fan 71 is rotated at the first rotational speed Nf1.

It should be noted that a normal control is performed for the cooling fan 71 when the engine rotational speed falls in neither the first range nor the second range, i.e., when the engine rotational speed is lower than Ne1 [rpm]. In other words, as described in Japan Patent No. 4285866, within a range of an upper speed limit Nfcmax [rpm] or less, the rotational speed of the cooling fan 71 is controlled by the fan controlling unit 95 to depend on the refrigerant temperature of the engine 20, the engine rotational speed and the hydraulic oil temperature. It should be noted that Nf1 is lower than Nfcmax, whereas Nf2 is higher than Nfcmax.

When the bulldozer 1 performs a normal operation, the engine refrigerant temperature, the engine rotational speed and the hydraulic oil temperature are kept at low values. Due to this, the cooling fan 71 is normally kept at a rotational speed of less than Nf1. Therefore, when the overrun state detecting unit 94 determines that the engine rotational speed falls in the first range, the rotational speed of the cooling fan 71 is supposed to be increased to Nf1 under a normal condition.

The fan controlling unit 95 includes the fan rotational speed setting unit 96, the fan pump controlling unit 97 and the electromagnetic valve controlling unit 98. When the engine rotational speed falls in the first range, the fan rotational speed setting unit 96 is configured to set the rotational speed of the cooling fan 71 to be the first rotational speed Nf1. When the engine rotational speed falls in the second range, the fan rotational speed setting unit 96 is configured to set the rotational speed of the cooling fan 71 to be the second rotational speed Nf2. When the engine rotational speed falls in neither the first range nor the second range, the fan rotational speed setting unit 96 is configured to set the rotational speed of the cooling fan 71 to a rotational speed depending on the refrigerant temperature of the engine 20, the engine rotational speed and the hydraulic oil temperature.

The fan pump controlling unit 97 is configured to calculate a target pump displacement Dp [cc/rev] of the fan variable displacement pump 61 on the basis of the following formula (1) with use of a rotational speed Nf of the cooling fan 71 set by the fan rotational speed setting unit 96 and an engine rotational speed Ne detected by the engine rotational speed sensor 55.

$$Dp = Nf \times Dm / (Ne \times \rho) \quad (1)$$

Dm [cc/rev]: the fixed Displacement of the hydraulic motor 65

ρ: a reduction ratio between the engine 20 and the variable displacement pump 61

The value of Dm and that of ρ have been preliminarily set, and are stored in the fan pump controlling unit 97. When calculating the target pump displacement Dp, the fan pump controlling unit 97 is configured to output a control signal to the fan pump swashplate drive portion 69 to achieve the calculated target pump displacement Dp. Then, the fan pump controlling unit 97 is configured to output the calculated target pump displacement Dp to the electromagnetic valve controlling unit 98.

It should be noted that with reference to the formula (1), the target pump displacement Dp of the fan variable displacement pump 61 obviously increases when the rotational speed Nf of the cooling fan 71 set by the fan rotational speed setting unit 96 remarkably increases in comparison with the engine rotational speed Ne. At this time, in the loads acting on the variable displacement pumps 21 and 22 in overrunning, the amount of load to be absorbed by the variable displacement pump 61 increases, and hence, the amount of load acting on the engine 20 decreases.

Figure 7:
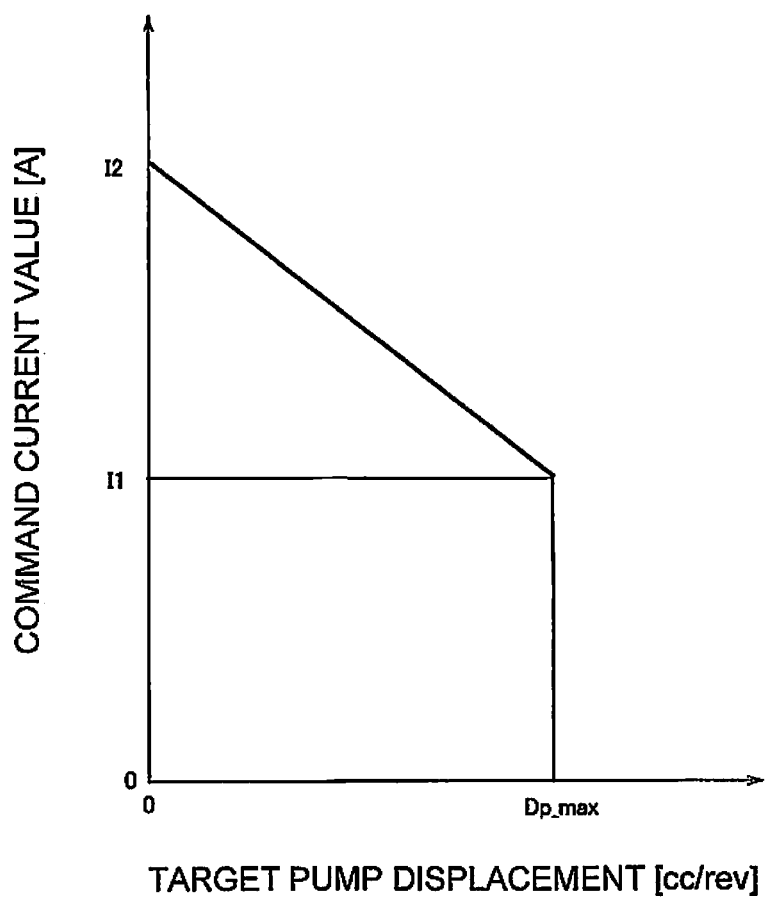
FIG. 7 is a diagram showing a relation between target pump displacement of a fan variable displacement pump and command current value for an electromagnetic switch valve.

The electromagnetic valve controlling unit 98 includes a fan pump displacement=current value table T5, and is configured to obtain a command current value that corresponds to the target pump displacement Dp and is transmitted to the electromagnetic switch valve 63. The fan pump displacement=current value table T5 is a table containing values of the command current that corresponds to the target pump displacement Dp and is transmitted to the electromagnetic switch valve 63. The fan pump displacement=current value table T5 is stored in the aforementioned storage device. FIG. 7 shows an exemplary relation between the target pump displacement Dp and command current value I. According to the relation, the magnitude of the command current value I linearly decreases from I2 [A] to I1 [A] in proportion to increase in the target pump displacement Dp from 0 [cc/rev] to the maximum value Dp max [cc/rev]. The electromagnetic valve controlling unit 98 is configured to output the obtained command current value I as a control signal to the electromagnetic switch valve 63.

When the overrun determining unit 93 determines that the bulldozer 1 is not in the overrun state, i.e., when the fan controlling unit 95 receives the overrun flag of "False", the fan controlling unit 95 is configured to terminate the control of regulating the rotational speed of the cooling fan 71 to be the first rotational speed or the second rotational speed. In other words, the fan controlling unit 95 is configured to perform the aforementioned control for where the engine rotational speed falls in neither the first range nor the second range.

It should be noted that Ne1 [rpm] has been preliminarily set to be a relatively large value such that the cooling fan 71 is controlled at the first rotational speed or the second rotational speed when the overrun determining unit 93 determines that the bulldozer 1 is in the overrun state. Preferably, Ne1 [rpm] is higher than the high idle rotational speed Nhi. Therefore, when the overrun state detecting unit 94 determines that the engine rotational speed detected by the engine rotational speed sensor 55 falls in either the first range or the second range, the overrun determining unit 93 is configured to determine that the bulldozer 1 is in the overrun state.

Figure 8:
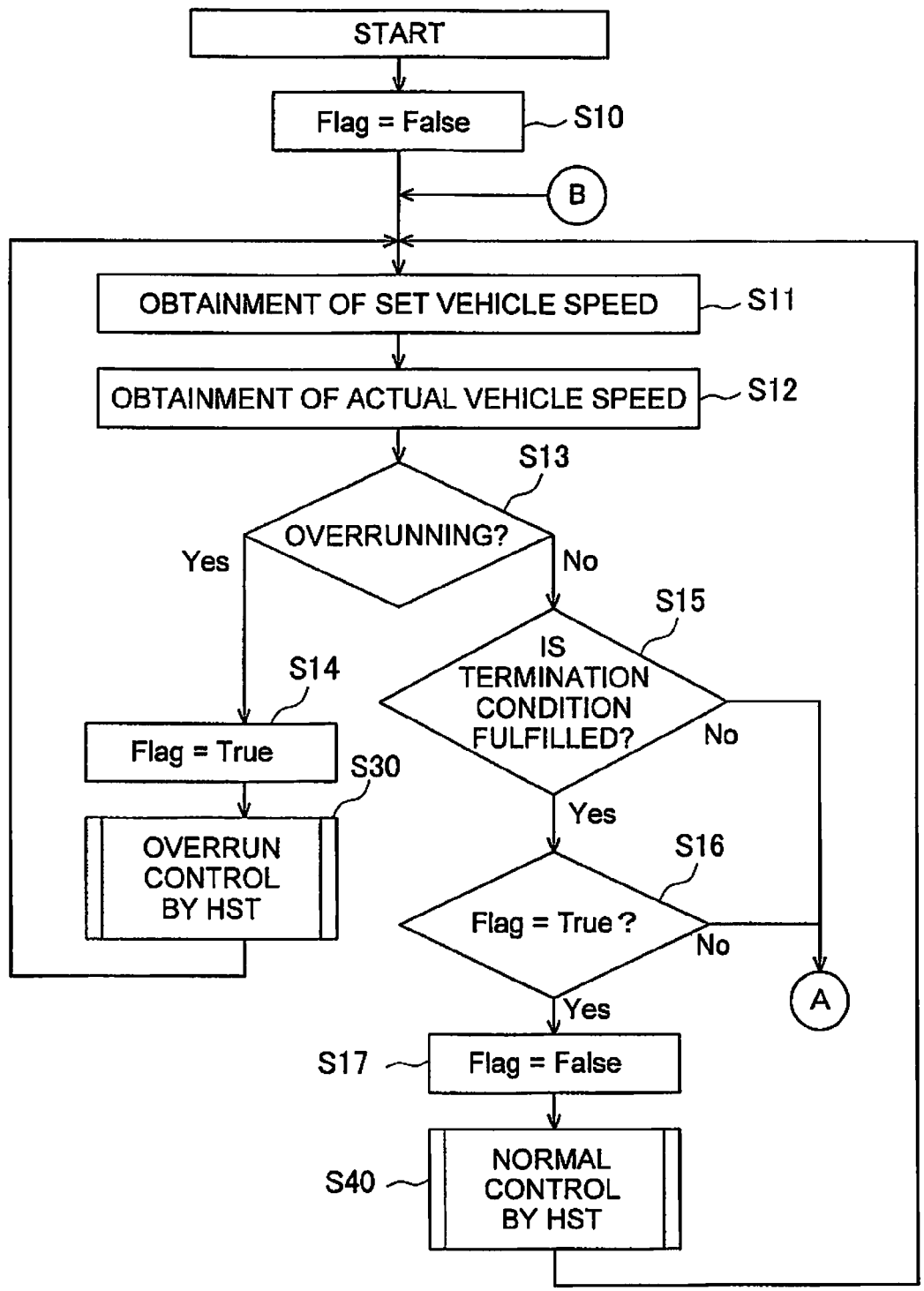
FIG. 8 is a flowchart of an overrun control method by the bulldozer according to the exemplary embodiment.
Figure 9:
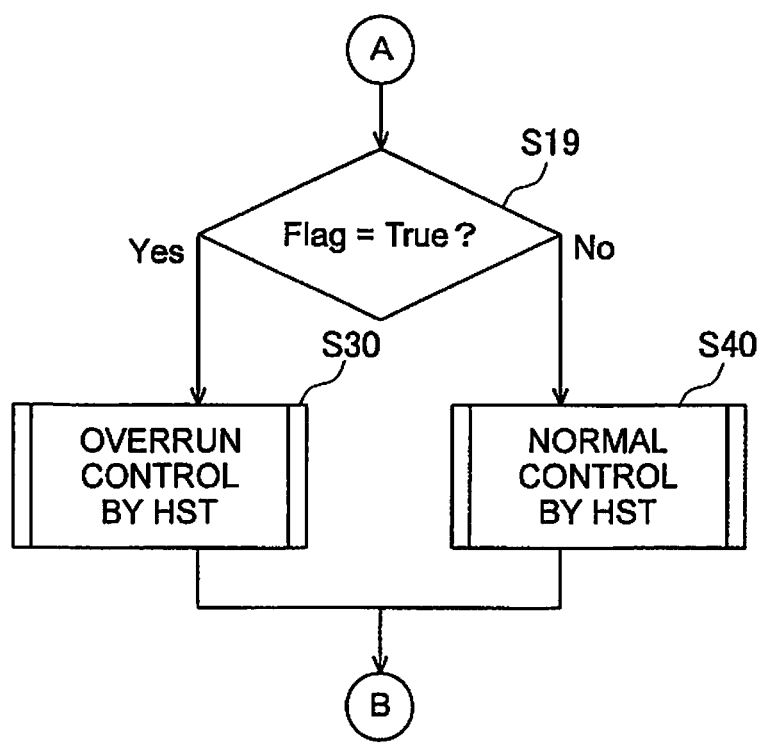
FIG. 9 is a flowchart of the overrun control method by the bulldozer according to the exemplary embodiment.

Next, an overrun control method by the bulldozer 1 will be explained in detail. FIGS. 8 and 9 are flowcharts of the overrun control method by the bulldozer 1 according to the present exemplary embodiment.

First in Step 10, the overrun determining unit 93 sets "False" as the initial value of the overrun flag. In Step 11, the gear stage setting unit 80 receives a signal from the shift up/down button sensor 52, sets a gear stage, and outputs the set gear stage as a gear stage command to the vehicle speed setting unit 81. The vehicle speed setting unit 81 obtains a set vehicle speed on the basis of the gear stage command and a forward/rearward movement command from the forward/rearward movement lever sensor 53. The overrun determining unit 93 receives the set vehicle speed from the vehicle speed setting unit 81.

In Step 12, the vehicle speed measuring unit 92 measures an actual vehicle speed of the bulldozer 1 on the basis of the rotational speed of the output shaft of the left variable displacement hydraulic motor 30 to be received from the left rotational speed sensor 56 and the rotational speed of the output shaft of the right variable displacement hydraulic motor 31 to be received from the right rotational speed sensor 57. The overrun determining unit 93 receives the actual vehicle speed from the vehicle speed measuring unit 92.

In Step 13, the overrun determining unit 93 determines whether or not the bulldozer 1 is in the overrun state through the comparison between the actual vehicle speed and the set vehicle speed. For example, the overrun determining unit 93 determines that the bulldozer 1 is in the overrun state when the actual vehicle speed is greater than or equal to a value obtained by adding a preliminarily set positive offset to the set vehicle speed.

When the bulldozer 1 is in the overrun state (Yes in Step 13), the overrun determining unit 93 sets the overrun flag to be "True" (Step 14). Then in Step 30, the pump controlling unit 83 and the motor controlling unit 86 perform the overrun control on the basis of the fact that the overrun flag is "True".

Figure 10:
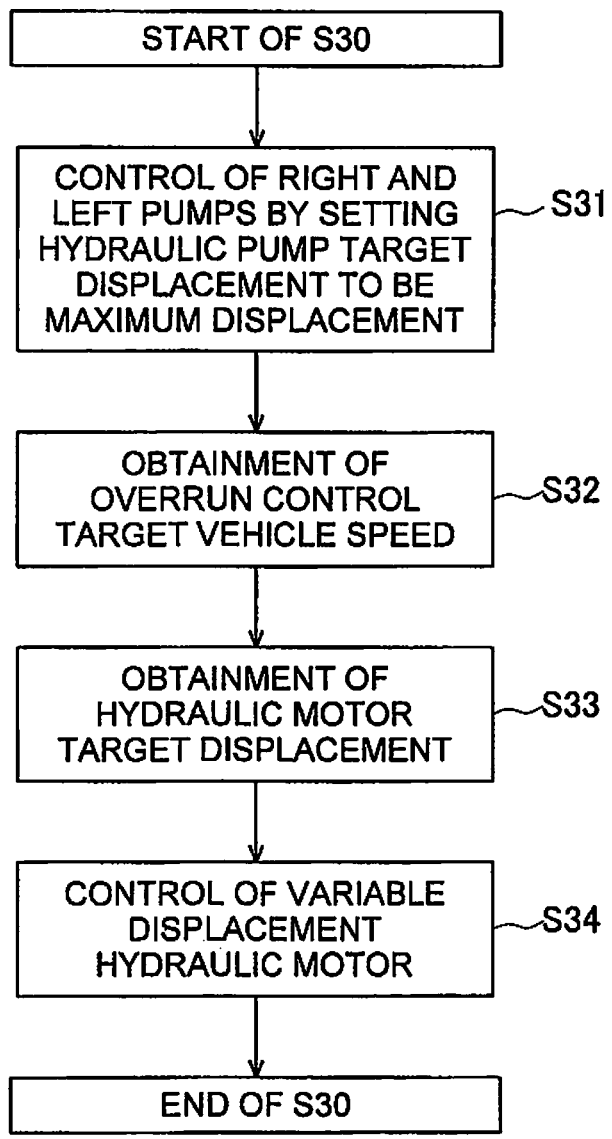
FIG. 10 is a flowchart of the overrun control method by a hydro-static transmission.

In the overrun control, in Step 31 of FIG. 10, the pump controlling unit 83 controls the left and right variable displacement pumps 21 and 22 such that the pump displacement reaches the maximum displacement Pqmax. In Step 32, the motor controlling unit 86 obtains the overrun control target vehicle speed by adding a preliminarily set offset of 0 or less to the set vehicle speed. In Step 33, the motor controlling unit 86 assigns the obtained overrun control target vehicle speed to the set vehicle speed, and accordingly, obtains the target displacement of each left/right variable displacement hydraulic motor 30, 31 from the set vehicle speed=motor displacement table T4. In Step 34, the motor controlling unit 86 controls the left and right variable displacement hydraulic motors 30 and 31 by converting the obtained target displacement into an electric command and outputting the electric command as a control signal to each left/right motor swashplate drive portion 32, 33.

When it is not determined that the bulldozer 1 is in the overrun state in Step 13 of FIG. 8 (No in Step 13), then in Step 15, the overrun determining unit 93 determines whether or not a condition for terminating the overrun control is fulfilled. Specifically, it is determined that the termination condition is fulfilled, for instance, when the actual vehicle speed becomes less than or equal to the overrun control terminating vehicle speed obtained by adding a preliminarily set offset of 0 or less to the set vehicle speed or when a predetermined period of time or greater elapses in the state that the traction force is greater than a predetermined threshold slightly smaller than 0. The overrun determining unit 93 is capable of determining that the traction force is greater than the aforementioned predetermined threshold on the basis of detection results of pressures by the hydraulic sensors 54c and 54d.

When the termination condition is fulfilled (Yes in Step 15), then in Step 16, the overrun determining unit 93 determines whether or not the overrun flag is "True". When the termination condition is not fulfilled (No in Step 15) or when the overrun flag is "False" (No in Step 16), the processing proceeds to Step 19 of FIG. 9.

When the overrun flag is "True" in Step 16 (Yes in Step 16), then in Step 17, the overrun determining unit 93 sets the overrun flag to be "False". Subsequently in Step 40, the pump controlling unit 83 and the motor controlling unit 86 perform a normal control on the basis of the fact that the overrun flag is "False".

Figure 11:
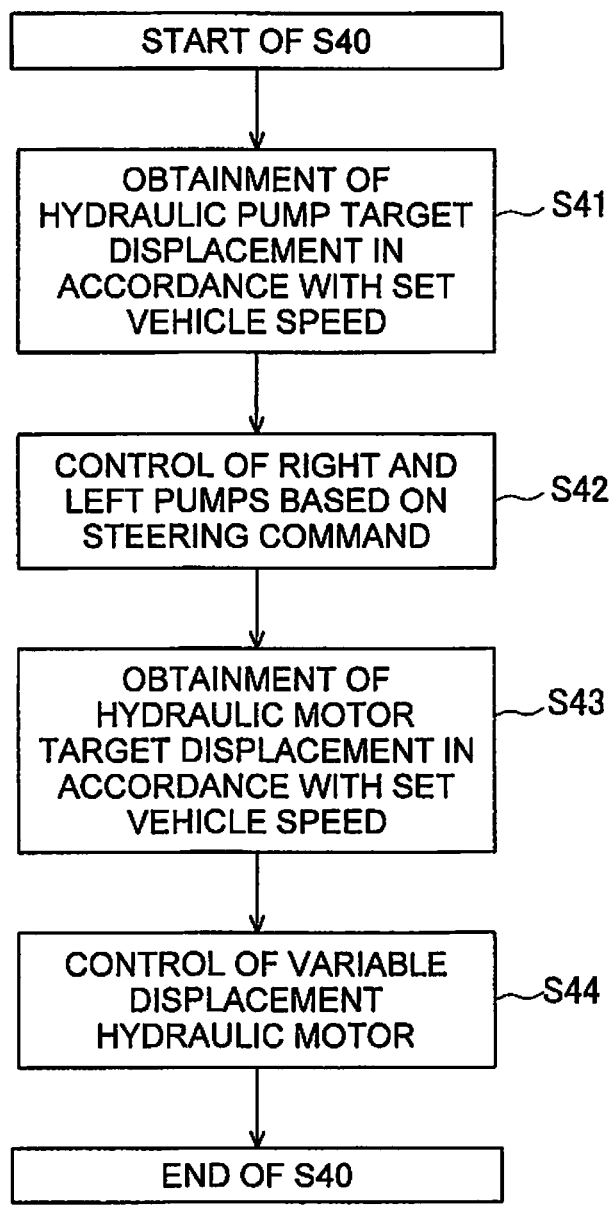
FIG. 11 is a flowchart of a normal motor/pump control method by the hydro-static transmission.

In the normal control, in Step 41 of FIG. 11, the pump displacement setting unit 84 in the pump controlling unit 83 sets the target pump displacement of each variable displacement pump 21, 22 in accordance with the set vehicle speed with reference to the set vehicle speed=pump displacement table T3. In Step 42, the pump displacement distributing unit 85 in the pump controlling unit 83 controls the left and right variable displacement pumps 21 and 22 by taking the steering command into account, accordingly converting the set target displacement into a current command, and outputting the current command as a control signal to each left/right pump swashplate drive portion 23, 24.

Next in Step 43, the motor controlling unit 86 obtains the target displacement of each left/right variable displacement hydraulic motor 30, 31 in accordance with the set vehicle speed with reference to the set vehicle speed=motor displacement table T4. In Step 44, the motor controlling unit 86 controls the left and right variable displacement hydraulic motors 30 and 31 by converting the obtained target displacement into a current command, and outputs the current command as a control signal to each left/right motor swashplate drive portion 32, 33.

When the termination condition is not fulfilled (No in Step 15 of FIG. 8) or when the overrun flag is "False" (No in Step 16 of FIG. 8), then in Step 19 of FIG. 9, the pump controlling unit 83 and the motor controlling unit 86 refer to the overrun flag. Subsequently, when the overrun flag is "True" (Yes in Step 19 of FIG. 9), the pump controlling unit 83 and the motor controlling unit 86 perform the aforementioned processing of Step 30. When the overrun flag is "False" (No in Step 19 of FIG. 9), the pump controlling unit 83 and the motor controlling unit 86 perform the aforementioned processing of Step 40.

Figure 12:
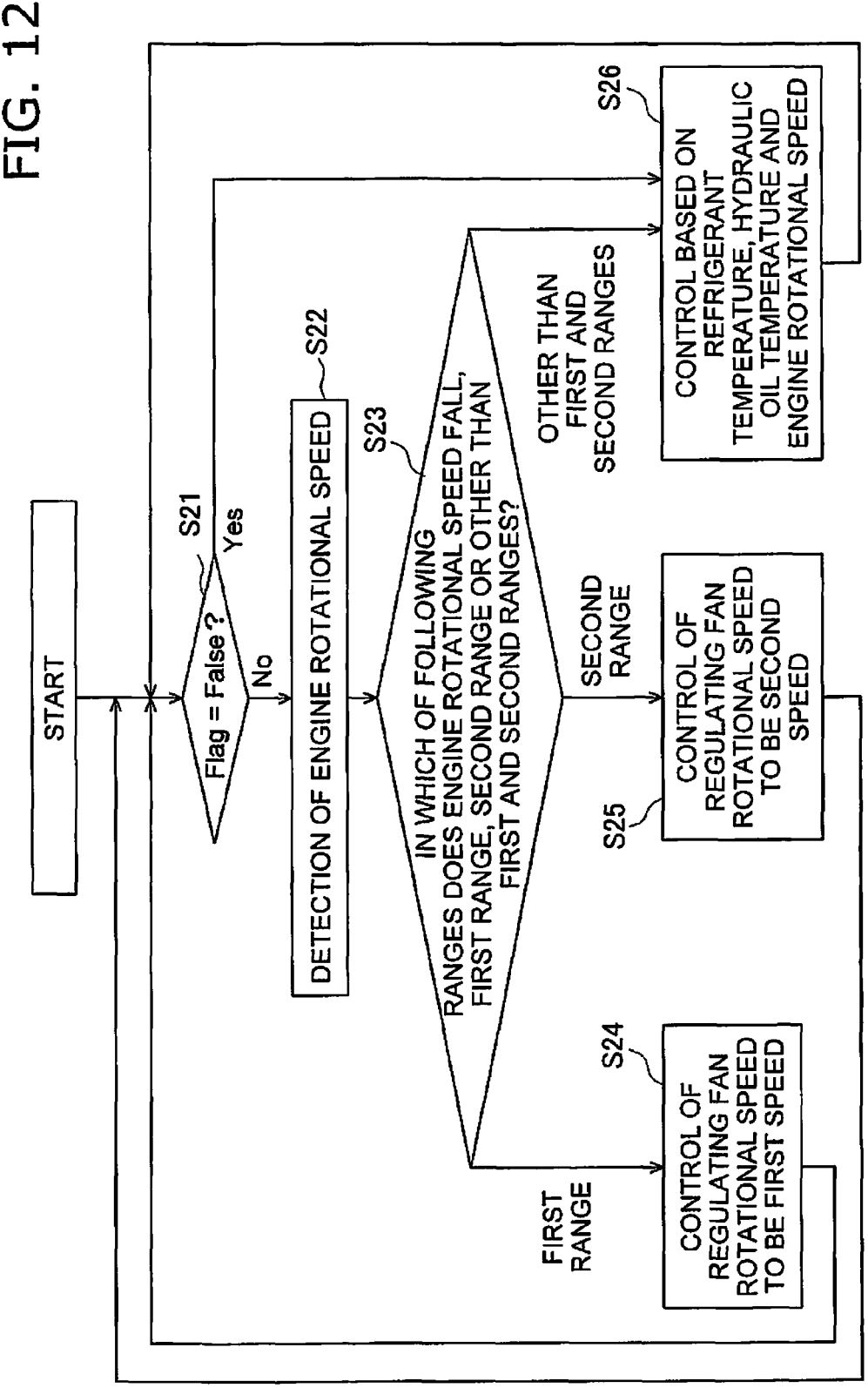
FIG. 12 is a flowchart of a rotational speed control method for a cooling fan according to the exemplary embodiment.

Next, a rotational speed control method of the cooling fan 71 in the present exemplary embodiment will be explained in detail. FIG. 12 is a flowchart of the rotational speed control method of the cooling fan 71 in the present exemplary embodiment. First in Step 21, the fan controlling unit 95 refers to the overrun flag set in Steps 10, 14 and 17, and determines whether or not the overrun flag is "False". When the overrun flag is "True" (No in Step 21), then in Step 22, the engine rotational speed sensor 55 detects the engine rotational speed. In Step 23, the overrun state detecting unit 94 determines whether or not the engine rotational speed falls in the first range, whether or not the engine rotational speed falls in the second range, and whether or not the engine rotational speed falls in neither the first range nor the second range.

When the engine rotational speed falls in the first range, then in Step 24, the fan controlling unit 95 controls the fan variable displacement pump 61 and the hydraulic motor 65 such that the rotational speed of the cooling fan 71 reaches the first rotational speed Nf1. When the engine rotational speed falls in the second range, then in Step 25, the fan controlling unit 95 controls the fan variable displacement pump 61 and the hydraulic motor 65 such that the rotational speed of the cooling fan 71 reaches the second rotational speed Nf2. When the engine rotational speed falls in neither the first range nor the second range, then in Step 26, the fan controlling unit 95 controls the cooling fan 71 such that the rotational speed of the cooling fan 71 depends on the refrigerant temperature of the engine 20, the engine rotational speed and the hydraulic oil temperature in a range of the upper speed limit Nfcmax or less.

It should be noted that when the overrun flag is "False" in Step 21, the fan controlling unit 95 performs Step 26. When the overrun flag is "False", the overrun determining unit 93 has determined that the bulldozer 1 is not in the overrun state. Therefore, when it is determined that the bulldozer 1 is not in the overrun state, the fan controlling unit 95 has terminated the control of regulating the rotational speed of the cooling fan 71 to be either the first rotational speed Nf1 or the second rotational speed Nf2.

Features

In the bulldozer 1, the variable displacement pump 61 for driving the cooling fan 71 as well as the variable displacement pumps 21 and 22 configured to receive the hydraulic pressure by the travelling of the drive unit is configured to be driven by the engine 20. When the overrun state is detected by the overrun state detecting unit 94, the variable displacement pump 61 and the hydraulic motor 65 are configured to be controlled to increase the rotational speed of the cooling fan 71. At this time, in the loads acting on the variable displacement pumps 21, 22 and 61 by overrunning, the amount of load to be absorbed by the variable displacement pump 61 increases. As a result, the amount of load acting on the engine 20 decreases, and overrunning is prevented.

Additionally, the fan rotational speed is controlled to increase in a stepwise manner in accordance with the state of overrunning. Therefore, when the extent of overrunning is relatively small, the sound of the fan does not increase in volume. When the extent of overrunning is relatively large, overrunning is reliably prevented, and simultaneously, the sound of the fan does not suddenly increase in volume. Therefore, the comfortableness of an operator can be maintained.

The minimum value of the engine rotational speed in the first range (Ne1: the first threshold, the first engine rotational speed) is larger than Nr [rpm] that is the rated rotational speed of the engine 20. More preferably, the first engine rotational speed Ne1 is higher than the high idle rotational speed Nhi. Therefore, when over-rotation of the engine 20 is caused by overrunning, the rotational speed of the cooling fan 71 increases. Accordingly, an increase in volume of the sound of the fan is caused only when overrunning occurs, and thus, the comfortableness of an operator is further enhanced.

The overrun determining unit 93 is configured to terminate the overrun control when the pressure of each hydraulic sensor 54c, 54d becomes less than or equal to a predetermined pressure. In other words, the overrun determining unit 93 is configured to terminate controlling the rotational speed of the cooling fan 71 to reach either the first rotational speed Nf1 or the second rotational speed Nf1. That the pressure of each hydraulic sensor 54c, 54d becomes less than or equal to the predetermined pressure means that the traction force becomes larger than the predetermined threshold slightly smaller than 0, i.e., that the force backwardly acting on the bulldozer 1 decreases. In consideration of the characteristic of a work to be performed by the bulldozer 1, the bulldozer 1 becomes an overrun state when moving rearward down a slope. Therefore, when the pressure of each hydraulic sensor 54c, 54d becomes less than or equal to the predetermined pressure, this means that the bulldozer 1 has moved down to flat land, and thus, further overrun control is no longer required. Consequently, the overrun control can be terminated at appropriate timing.

The overrun determining unit 93 is configured to determine that the bulldozer 1 is not in the overrun state when the actual vehicle speed becomes less than or equal to the overrun control terminating vehicle speed obtained by adding a predetermined offset of 0 or less to the set vehicle speed. Then, the overrun determining unit 93 is configured to terminate controlling the rotational speed of the cooling fan 71 to reach either the first rotational speed Nf1 or the second rotational speed Nf2. The overrun determining unit 93 is capable of quickly determining termination of overrunning. Hence, a period of time of high-speed rotation of the cooling fan 71 is reduced.

The second rotational speed Nf2 of the cooling fan 71 is higher than the upper speed limit Nfcmax of the cooling fan 71 to be applied when the engine rotational speed is lower than the first engine rotational speed Ne1. Due to this, when the overrun control is not being performed, the rotational speed of the cooling fan 71 is reduced low to prevent the cooling fan 71 from producing noise. Therefore, the comfortableness of an operator is further enhanced.

The difference between the minimum value Net in the second range and the minimum value Ne1 in the first range is greater than or equal to 50 rpm and less than or equal to 300 rpm. Due to this, excessive increase in engine rotational speed is prevented even when time delay occurs when the rotational speed of the cooling fan 71 increases.

The difference between the second rotational speed Nf2 and the first rotational speed Nf1 is greater than or equal to 250 rpm and less than or equal to 600 rpm. Due to this, even when the second rotational speed Nf2 is a high rotational speed whereby overrunning can be reliably prevented, the first rotational speed Nf1 is reduced to a rotational speed not enough to produce noise. Therefore, when overrunning occurs, the fan controlling unit 95 firstly controls the fan rotational speed to an extent not enough to produce noise to reduce the engine rotational speed. When the engine rotational speed still increases under the condition, the fan controlling unit 95 is capable of inhibiting increase in engine rotational speed by further increasing the rotational speed of the hydraulic drive fan.

In the bulldozer 1, the cooling device 70 including the cooling fan 71 is disposed rearward of and adjacently to the cab 7. Therefore, noise to be produced by the rotation of the cooling fan 71 greatly affects the comfortableness of an operator. The control method of the cooling fan 71 in accordance with exemplary embodiments of the present invention is quite effective in such a work vehicle.

Modifications

The present invention is not limited to the exemplary embodiment as described above, and a variety of changes or modifications can be made without departing from the scope of the present invention.

The aforementioned exemplary embodiment has exemplified the construction that the cooling device 70 is disposed rearward of and lower than the cab 7. However, the cooling device 70 may be disposed forward of the cab 7. It should be noted that as with the aforementioned exemplary embodiment, when the cooling device 70 is disposed immediately rearward of the cab 7, sound of the cooling fan 71 audible from an operator seated in the cab 7 further increases in volume, and thus, the present invention is further effective.

The aforementioned exemplary embodiment has explained the rotational speed control of the cooling fan 71 to be performed when the engine rotational speed falls in two ranges composed of the first range and the second range. However, the rotational speed control of the cooling fan 71 may be performed in three or more ranges of the engine rotational speed. Additionally, in the case of three or more ranges of the engine rotational speed, the fan rotational speed setting unit 96 desirably sets the rotational speed of the cooling fan 71 to increase as the minimum value of the engine rotational speed in each range increases.

In the aforementioned exemplary embodiment, the overrun state detecting unit 94 is configured to detect the overrun state on the basis of the engine rotational speed. However, the overrun state detecting unit 94 may be configured to obtain the actual vehicle speed to be measured through the left and right rotational speed sensors 56 and 57 and detect the overrun state on the basis of the actual vehicle speed. For example, the overrun state detecting unit 94 may be configured to determine in which of the aforementioned first and second ranges the actual vehicle speed falls with reference to a first vehicle speed that corresponds to the aforementioned first threshold and a second vehicle speed that corresponds to the aforementioned second threshold and is higher than the first vehicle speed. Additionally, in the aforementioned exemplary embodiment, the overrun state detecting unit 94 may include the engine rotational speed sensor 55.

As a type of work vehicles equipped with a hydro-static transmission, a work vehicle is provided whereby even when an increase in displacement of a hydraulic pump is limited, overrunning is controllable by another means.

The invention claimed is:

1. A work vehicle, comprising:
an engine;
a fan variable displacement pump and a first travelling variable displacement pump, both of which being configured to be driven by the engine;
a first travelling variable displacement motor configured to be rotated by a pressurized oil of the first travelling variable displacement pump;
a drive unit configured to be driven by the first travelling variable displacement motor;
a fan motor configured to be rotated by a pressurized oil of the fan variable displacement pump;
a fan configured to be driven by the fan motor;
an overrun state detecting unit configured to detect an overrun state of the drive unit; and
a control unit configured to execute a normal control of a rotational speed of the fan based on at least an engine refrigerant temperature when a detection value detected by the overrun state detecting unit control is smaller than a first threshold and execute an overrun control of the rotational speed of the fan when the detection value is equal to or larger than the first threshold, the overrun control being configured such that
the rotational speed of the fan is controlled to reach a first fan rotational speed by increasing the rotational speed of the fan when the detection value is greater than or equal to the first threshold and smaller than a second threshold, the second threshold being larger than the first threshold, and
the rotational speed of the fan is controlled to reach a second fan rotational speed higher than the first fan rotational speed when the detection value becomes greater than or equal to the second threshold.

2. The work vehicle according to claim 1, wherein
the overrun state detecting unit includes an engine rotational speed detecting unit configured to detect a rotational speed of the engine,
the detection value is the engine rotational speed,
the first threshold is a first engine rotational speed, and
the second threshold is a second engine rotational speed higher than the first engine rotational speed.

3. The work vehicle according to claim 2, wherein
the first engine rotational speed is higher than a rated rotational speed.

4. The work vehicle according to claim 2, wherein
the first engine rotational speed is higher than a high idle rotational speed.

5. The work vehicle according to claim 1, wherein
the second fan rotational speed is higher than an upper rotational speed limit of the fan to be applied when the engine rotational speed is lower than the first engine rotational speed.

6. The work vehicle according to claim 1, wherein
a difference between the second engine rotational speed and the first engine rotational speed is greater than or equal to 50 rpm and less than or equal to 300 rpm.

7. The work vehicle according to claim 1, wherein
a difference between the second fan rotational speed and the first fan rotational speed is greater than or equal to 250 rpm and less than or equal to 600 rpm.

8. The work vehicle according to claim 1, further comprising
a second travelling variable displacement pump configured to be driven by the engine; and
a second travelling variable displacement motor configured to be rotated by a pressurized oil of the second travelling variable displacement pump,
the drive unit being configured to be driven by the second travelling variable displacement motor,
the drive unit including right and left crawler belts and right and left sprockets respectively configured to drive the right and left crawler belts,
the first travelling variable displacement motor being configured to drive one of the right and left sprockets, and
the second travelling variable displacement motor being configured to drive the other of the right and left sprockets.

9. The work vehicle according to claim 1, wherein
the first fan rotational speed and the second fan rotational speed are predetermined constant values.

10. The work vehicle according to claim 1, further comprising
a cab disposed rearward of the engine; and
the fan being disposed rearward of and adjacent to the cab.

11. The work vehicle according to claim 1, further comprising
a vehicle speed setting unit configured to set a target vehicle speed based on an operating signal detected from an operating member; and
a vehicle speed measuring unit configured to measure an actual speed of the work vehicle,
the control unit being configured to terminate the overrun control when the actual vehicle speed becomes less than or equal to a predetermined vehicle speed less than or equal to the target vehicle speed.

12. A work vehicle, comprising:
an engine;
a fan variable displacement pump and a first travelling variable displacement pump, both of which being configured to be driven by the engine;
a first travelling variable displacement motor configured to be rotated by a pressurized oil of the first travelling variable displacement pump;
a drive unit configured to be driven by the first travelling variable displacement motor;
a fan motor configured to be rotated by a pressurized oil of the fan variable displacement pump;
a fan configured to be driven by the fan motor;
an overrun state detecting unit configured to detect an overrun state of the drive unit;
a control unit configured to control a rotational speed of the fan to reach a first fan rotational speed by increasing the rotational speed of the fan when a detection value detected by the overrun state detecting unit becomes greater than or equal to a first, the control unit being configured to control the rotational speed of the fan to reach a second fan rotational speed higher than the first fan rotational speed when the detection value becomes greater than or equal to a second threshold greater than the first threshold;
a vehicle speed setting unit configured to set a target vehicle speed based on an operating signal detected from an operating member; and
a vehicle speed measuring unit configured to measure an actual speed of the work vehicle, the control unit being configured to terminate controlling the rotational speed of the fan to reach either the first fan rotational speed or the second fan rotational speed when the actual vehicle speed becomes less than or equal to a predetermined vehicle speed less than or equal to the target vehicle speed.

* * * * *